United States Patent
Sigl et al.

(10) Patent No.: US 9,115,798 B2
(45) Date of Patent: Aug. 25, 2015

(54) DRIVE DEVICE FOR THE ROAD WHEELS OF A VEHICLE

(71) Applicants: Horst Sigl, Passau (DE); Paul Lenz, Waldkirchen (DE)

(72) Inventors: Horst Sigl, Passau (DE); Paul Lenz, Waldkirchen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/183,763

(22) Filed: Feb. 19, 2014

(65) Prior Publication Data

US 2014/0235395 A1    Aug. 21, 2014

(30) Foreign Application Priority Data

Feb. 19, 2013 (DE) .......................... 10 2013 202 594

(51) Int. Cl.
*F16H 57/04* (2010.01)
*F16H 48/08* (2006.01)

(52) U.S. Cl.
CPC ........ *F16H 57/0423* (2013.01); *F16H 57/0409* (2013.01); *F16H 57/0483* (2013.01); *F16H 48/08* (2013.01)

(58) Field of Classification Search
None
See application file for complete search history.

(56) References Cited

U.S. PATENT DOCUMENTS

| 5,505,112 A | 4/1996 | Gee |
| 6,374,951 B1 | 4/2002 | Michelhaugh |
| 2006/0048600 A1 | 3/2006 | Taguchi |

FOREIGN PATENT DOCUMENTS

| DE | 19833536 | 1/2000 |
| DE | 102011003221 | 8/2012 |
| DE | 102012004279 | 5/2013 |
| EP | 0067639 | 12/1982 |
| EP | 1918613 | 7/2008 |
| GB | 2103301 | 2/1983 |
| JP | H11-98616 | 4/1999 |
| JP | 2011-256918 | 12/2011 |

OTHER PUBLICATIONS

Machine translation of DE 102011003221 A1 retrieved from worldwide.espacenet.com on Jul. 31, 2014.*

* cited by examiner

*Primary Examiner* — Justin Holmes
*Assistant Examiner* — Timothy M Hannon
(74) *Attorney, Agent, or Firm* — Cozen O'Connor

(57) ABSTRACT

A drive device for the road wheels of a vehicle, with a stationary housing partially filled with a lubricating liquid, and a rotatably drivable driveshaft inserted into the housing interior and with a differential unit having a crown wheel with a differential housing. The crown wheel is rotatably drivable by the driving gear wheel, by means of which crown wheel a plurality of differential gear wheels of the differential unit are rotatably drivable, driven gear wheels being rotatably drivable in turn by these differential gear wheels. The driven gear wheels being drivingly connected in each instance to driven shafts for driving the road wheels of the vehicle. The differential unit is enclosed in the housing interior by a shielding housing, wherein the stationary housing interior is connected to the shielding housing interior via one or more apertures.

16 Claims, 3 Drawing Sheets

DRIVE DEVICE FOR THE ROAD WHEELS OF A VEHICLE

BACKGROUND OF THE INVENTION

1. Field of the Invention

The invention is directed to a drive device for the road wheels of a vehicle with a stationary housing. The interior of the housing is partially filled with a lubricating liquid, and a rotatably drivable driveshaft is inserted into the housing interior. The driveshaft carries a driving gear wheel at the end of the driveshaft projecting into the housing interior. A differential unit has a crown wheel with a differential housing. The crown wheel is rotatably bearing-mounted in the housing and is rotatably driven by the driving gear wheel. The crown wheel rotatably drives a plurality of differential gear wheels of the differential unit. Driven gear wheels are rotatably driven in turn by these differential gear wheels. The driven gear wheels are drivingly connected in each instance to driven shafts for driving the road wheels of the vehicle.

2. Background of the Invention

In a drive device of the type mentioned above, it is known for the differential unit to be immersed in the lubricating liquid in the housing interior. This leads to extensive oil splash loss particularly at high rotational speeds.

SUMMARY OF THE INVENTION

Therefore, it is an object of the invention to provide a drive device of the type mentioned above which is constructed in a simple manner and which prevents extensive oil splash loss particularly at high rotational speeds.

This object is met according to the invention in that the differential unit is enclosed in the stationary housing interior by a shielding housing, wherein the stationary housing interior is connected to the shielding housing interior via one or more apertures formed in the shielding housing.

Therefore, during their rotating movement the differential unit and particularly the crown wheel no longer move the entirety of lubricating liquid present in the housing interior but rather only the considerably smaller amount of lubricating liquid contained in the shielding housing.

The lubricating liquid level in the shielding housing interior can adapt to the lubricating liquid level in the housing interior via the apertures and can accordingly compensate for leakage losses. Therefore, there is always a defined amount of lubricating liquid present in the shielding housing.

During operation, the level of the lubricating liquid in the shielding housing drops in a localized manner. Therefore, the immersion depth of the crown wheel and differential housing is reduced, which causes a reduction in the load-independent losses, i.e., the oil splash loss.

The reduction in oil splash loss in turn has a positive influence on the temperature of the lubricating liquid and therefore also on the aging of the lubricating liquid.

Further, the shielding housing prevents the differential unit from having a strong influence on the oil distribution in the housing, particularly in an axle bracket connected to the housing, through the rotation of the crown wheel which generates a pumping effect.

The shielding housing can enclose the differential unit so as to be adapted approximately to the outer contour of the differential unit in order to keep the shielding housing interior, and therefore also the amount of lubricating liquid contained therein, as small as possible. This further reduces oil splash losses.

The shielding housing is preferably fixedly arranged at the housing for the purpose of positioning the shielding housing in a simple manner.

A simple assembly and a simple construction of the shielding housing are achieved in that the shielding housing is formed of a plurality of parts.

To facilitate assembly, the shielding housing can be formed of a first shielding shell and a second shielding shell, the first shielding shell being arranged axially on a first side of the differential unit and the second shielding shell being arranged on a second side of the differential unit axially opposed to the first side of the differential unit. In this way, each shielding shell can be moved axially into its target position during assembly.

When the first shielding shell and/or the second shielding shell extend(s) radially outward up to the inner wall of the interior of the housing, the inner wall of the housing interior forms a wall of the shielding housing interior which connects the two shielding shells to one another.

The above described apertures are preferably formed as follows. The first shielding shell is arranged as close as possible axially to the crown wheel when the first shielding shell has a first axial opening which surrounds an axial rotationally symmetrical area of the crown wheel or of a structural component part connected to the crown wheel.

In the same way, the second shielding shell can be arranged as close as possible axially to the crown wheel and/or the differential housing when the second shielding shell has a second axial opening which surrounds an axial rotationally symmetrical area of the crown wheel or of a structural component part connected to the crown wheel and/or of the differential housing.

When there is an annular gap between the first axial opening of the first shielding shell and rotationally symmetrical area of the crown wheel or of a structural component part connected to the crown wheel and/or between the second axial opening of the second shielding shell and the rotationally symmetrical area of the crown wheel or of the structural component part connected to the crown wheel and/or of the differential housing, the pressure of the lubricating liquid increases during the rotational movement of the differential unit in the differential area such that a good lubrication of the structural component parts in the area of the gap is achieved.

The first shielding shell and/or the second shielding shell are/is preferably fastened to the differential housing in any suitable manner.

For the purpose of guiding the driveshaft into the shielding housing, the shielding housing can have a radial through-opening through which the rotatably drivable driveshaft is guided into the shielding housing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment of the invention is described more fully in the following description and is shown in the accompanying drawing in which.

DETAILED DESCRIPTION OF THE PRESENTLY PREFERRED EMBODIMENTS

Figure 1:
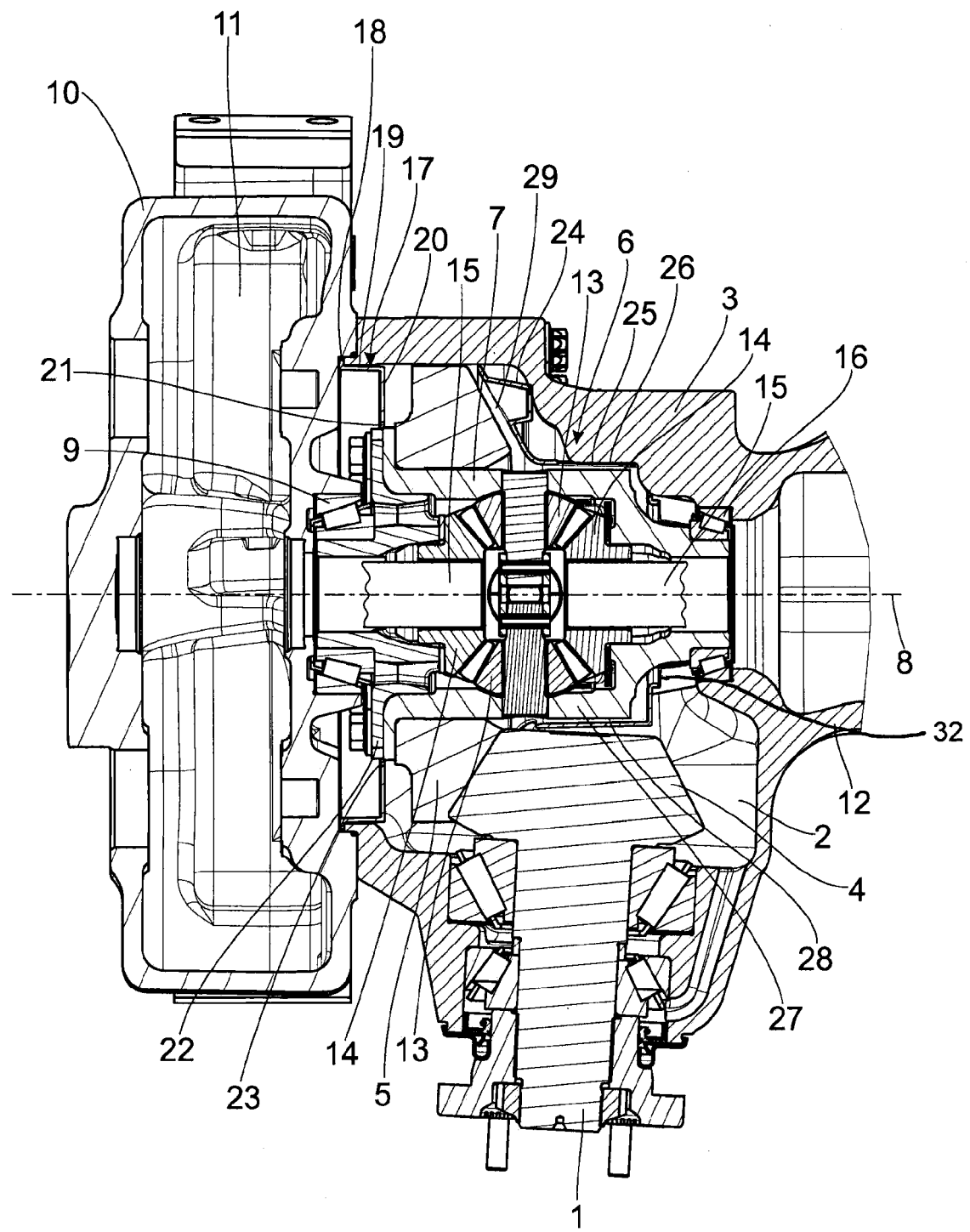
FIG. 1 is a sectional top view of a drive device for the road wheels of a vehicle in accordance with the present invention.

FIG. 1 shows a driveshaft 1 which is rotatably drivable by an engine of a vehicle and is guided into the interior 2 of a stationary housing 3 approximately horizontally.

At its end projecting into the housing 3, the driveshaft 1 carries a driving gear wheel 4 which is formed as a bevel gear and which meshes in a crown wheel 5 of a differential unit 6, which crown wheel 5 is likewise formed as a bevel gear.

The crown wheel 5 is fixedly connected to a differential housing 7 and is bearing-mounted with the latter at two differential bearings 9, 16 so as to be rotatable around an axis of rotation 8 extending at right angles to the axis of rotation of the driveshaft 1.

The first differential bearing 9 is arranged at a portal housing 10 which is connected to housing 3 by means of a screw connection. The housing interior 2 is likewise connected to the portal housing interior 11.

The housing 3 forms an axial end area of a tubular axle bracket 12 axial to the axis of rotation 8.

The second differential bearing 16 is arranged at the axle bracket 12.

Two opposed differential gear wheels 13 formed as bevel gears are bearing-mounted at the differential housing 7 so as to be freely rotatable. Both differential gear wheels 13 engage in driven gear wheels 14 which are formed as bevel gears and which are fixedly arranged on driven shafts 15 and which extend opposed to one another into the portal housing 10 on the one hand and through the axle bracket 12 on the other hand and serve to indirectly drive road wheels.

Housing interior 2, portal housing interior 11 and axle bracket 12 are partially filled with a lubricating liquid, e.g., oil, generally at a level of about 10 mm below the axis of rotation.

Figure 2:
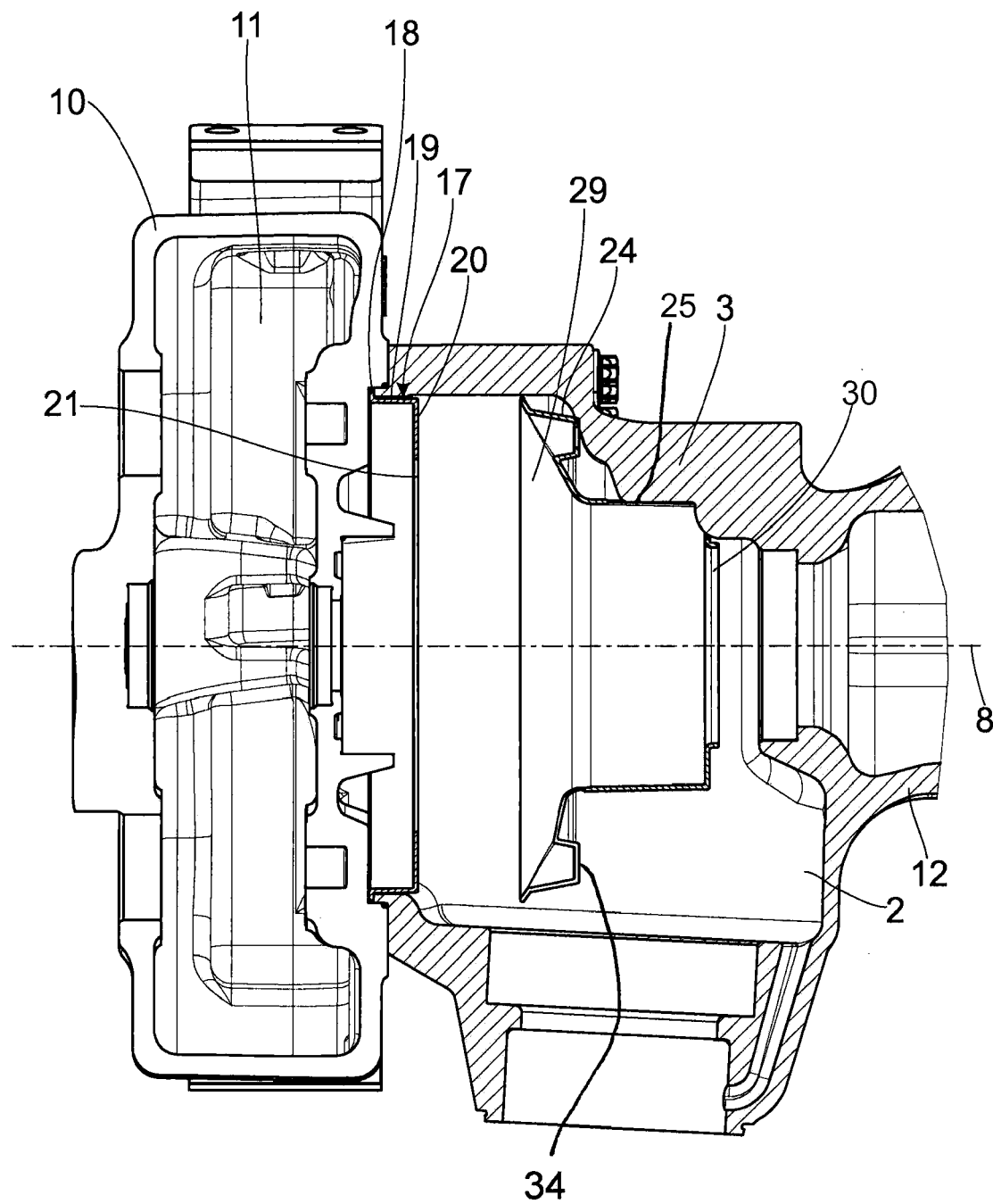
FIG. 2 is the sectional view of FIG. 1 showing the first and second shielding shells without the gear parts of the differential unit.
Figure 3:
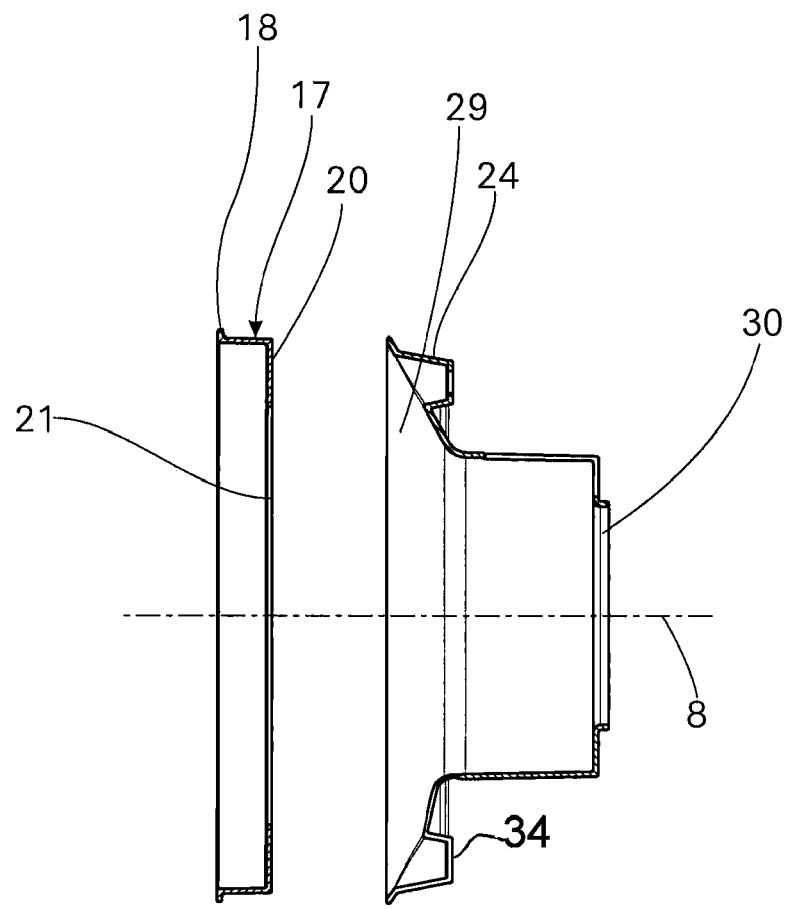
FIG. 3 is a sectional view of only the first and second shielding shells in accordance with the present invention.

As seen in FIGS. 1-3, a first shielding shell 17 is clamped axially between the left-hand end of the housing 3 and the portal housing 10. This first shielding shell 17 is cup-shaped and has at the opening of the cup a circumferential edge 18 which is directed radially outward in a flange-like manner and which is clamped between housing 3 and portal housing 10 and thus holds the first shielding shell 17 in position axially.

The first shielding shell 17 is held in position radially in that it is guided by the lateral surface of its cup wall 19 at the inner wall of the housing 3.

At its base 20, the first shielding shell 17 has a rotationally symmetrical first axial opening 21 through which is guided a rotationally symmetrical area of a structural component part 22 that is fixedly connected to the crown wheel 5, a first annular gap or aperture 23 being formed between the first axial opening 21 and the rotationally symmetrical area of the structural component part 22.

A second shielding shell 24 is arranged on the right-hand side of the crown wheel 5. This second shielding shell 24 extends along the contour of the crown wheel 5 at a slight distance therefrom and further along the contour of the differential housing 7 and is inserted with its tubular right-hand end area 25 in a corresponding cylindrical area 26 of the housing 3.

A second annular gap or aperture 32 is formed between the second axial opening 30 and the rotationally symmetrical area of the differential housing 27 extending through the second axial opening 30. A further annular gap 28 is formed between the tubular end area 25 of the second shielding shell 24 and a cylindrical differential housing area 27 enclosed by the latter.

The second shielding shell 24 also has a through-opening 34, visible in the depicted sectional view of FIG. 2, through which the driveshaft 1 projects by its driving gear wheel 4 into the shielding housing interior 29 formed by the two shielding shells 17, 24 and part of the inner wall of housing 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive device for the road wheels of a vehicle comprising:
 a stationary housing (3) having a housing interior (2) partially filled with a lubricating liquid;
 a driving gear wheel (4) projecting into said housing interior (2);
 a rotatable drive shaft (1) extending into said housing interior (2), said drive shaft carrying said gear wheel (4) at an end thereof;
 a differential unit (6) comprising a crown wheel (5) and a differential housing (7), said crown wheel (5) being rotatably bearing-mounted in said stationary housing (3) and rotatably drivable by said driving gear wheel (4);
 a plurality of differential gear wheels (13) rotatably drivable by said crown wheel (5);
 driven gear wheels (14) rotatably drivable by said differential gear wheels (13), said driven gear wheels (14) being drivingly connected to driven shafts (15) for driving the road wheels of the vehicle;
 a shielding housing (17, 24) having a shielding housing interior (29) and being disposed within said stationary housing (3) for enclosing said differential unit (6) on all sides; wherein said shielding housing comprises at least one aperture (23, 28, 32) disposed in an area in which the lubricating liquid is present in said housing interior (2) so as to connect said stationary housing interior (2) to said shielding housing interior (29); and
 wherein said shielding housing comprises a first shielding shell (17) and a second shielding shell (24) axially spaced from said first shielding shell (17); and wherein said first shielding shell (17) comprises a radially inwardly extending base (20) defining one of said at least one apertures and is arranged axially on a first side of said differential unit (6) and said second shielding shell

(24) is arranged on a second side of said differential unit (6) axially opposed to the first side of said differential unit (6)

wherein said housing interior (2) of said stationary housing (3) is bounded by an inner wall; and wherein at least one of said first shielding shell (17) and said second shielding shell (24) extends radially outward so as to contact said inner wall of said housing interior (2) of said stationary housing (3).

2. The drive device according to claim 1, wherein said shielding housing encloses said differential unit (6) so as to be adapted approximately to an outer contour of said differential unit (6).

3. The drive device according to claim 1, wherein said shielding housing is fixedly arranged at said stationary housing (3).

4. The drive device according to claim 1, wherein said shielding housing is formed of a plurality of parts.

5. The drive device according to claim 4, wherein said first shielding shell (17) has a first axial opening (21) surrounding an axial rotationally symmetrical area of said crown wheel (5) or a structural component part (22) connected to said crown wheel (5).

6. The drive device according to claim 5, wherein an annular gap (23) is defined between said first axial opening (21) of said first shielding shell (17) and said rotationally symmetrical area of said crown wheel (5) or said structural component part (22) connected to said crown wheel; and an annular gap (28, 32) is defined between said second axial opening (30) of said second shielding shell (24) and said rotationally symmetrical area of the crown wheel (5) or said structural component part connected to said crown wheel and/or between said second shielding shell and said differential housing (7).

7. The drive device according to claim 5, wherein said second shielding shell (24) has a second axial opening (30) surrounding an axial rotationally symmetrical area of said crown wheel (5) or a structural component part connected to said crown wheel (5) and/or said differential housing (27).

8. The drive device according to claim 5, wherein at least one of said first shielding shell (17) and said second shielding shell (24) is fastened to said stationary housing (3).

9. The drive device according to claim 4, wherein said second shielding shell (24) has a second axial opening (30) surrounding an axial rotationally symmetrical area of said crown wheel (5) or a structural component part connected to said crown wheel (5) and/or said differential housing (27).

10. The drive device according to claim 9, wherein an annular gap (28, 32) is defined between at least one of said second axial opening (30) of said second shielding shell (24), said rotationally symmetrical area of the crown wheel (5), said structural component part connected to said crown wheel (5) and said differential housing (7).

11. The drive device according to claim 1, wherein at least one of said first shielding shell (17) and said second shielding shell (24) is fastened to said stationary housing (3).

12. The drive device according to claim 1, wherein said shielding housing has a radial through-opening (34) through which opening said rotatable driveshaft (1) is guided into said shielding housing.

13. The drive device according to claim 1, wherein said first shielding shell (17) has a first axial opening (21) surrounding at least one of an axial rotationally symmetrical area of said crown wheel (5) and a structural component part (22) connected to said crown wheel (5).

14. The drive device according to claim 1, wherein said first shielding shell (17) has a first axial opening (21) surrounding at least one of an axial rotationally symmetrical area of said crown wheel (5) and a structural component part (22) connected to said crown wheel (5).

15. The drive device according to claim 1, wherein said second shielding shell (24) has a second axial opening (30) surrounding an axial rotationally symmetrical area of said crown wheel (5) or a structural component part connected to said crown wheel (5) and/or said differential housing (27).

16. The drive device according to claim 1, wherein said second shielding shell (24) has a second axial opening (30) surrounding an axial rotationally symmetrical area of said crown wheel (5) or a structural component part connected to said crown wheel (5) and/or said differential housing (27).

* * * * *